(12) United States Patent
Crandall et al.

(10) Patent No.: US 7,729,262 B2
(45) Date of Patent: Jun. 1, 2010

(54) METHOD AND SYSTEM FOR ASSIGNING CHANNELS IN A WIRELESS LAN

(75) Inventors: Toby Crandall, Hertford, NC (US); Hui Luo, Marlboro, NJ (US); Nemmara K. Shankaranarayanan, Bridgewater, NJ (US)

(73) Assignee: AT&T Corp., New York, NY (US)

( * ) Notice: Subject to any disclaimer, the term of this patent is extended or adjusted under 35 U.S.C. 154(b) by 699 days.

(21) Appl. No.: 11/216,274

(22) Filed: Aug. 30, 2005

(65) Prior Publication Data
US 2006/0072502 A1 Apr. 6, 2006

Related U.S. Application Data

(60) Provisional application No. 60/606,020, filed on Aug. 31, 2004.

(51) Int. Cl.
  H04L 12/26 (2006.01)
  H04W 40/00 (2009.01)
  H04J 3/16 (2006.01)
  G06F 15/173 (2006.01)

(52) U.S. Cl. .................. 370/238; 370/329; 370/437; 709/241; 455/445

(58) Field of Classification Search ......... 370/229–238, 370/329–341, 437; 709/223–226, 232, 238–244
See application file for complete search history.

(56) References Cited

U.S. PATENT DOCUMENTS 6,052,594 A * 4/2000 Chuang et al. ............... 455/450
6,418,136 B1 * 7/2002 Naor et al. ................... 370/347
6,493,331 B1 * 12/2002 Walton et al. ................ 370/341
6,567,420 B1 5/2003 Tiedemann et al.
6,636,737 B1 * 10/2003 Hills et al. ................... 455/450
7,110,374 B2 * 9/2006 Malhotra et al. ............. 370/329
7,206,586 B2 * 4/2007 Kim et al. ................... 455/450
7,307,961 B2 * 12/2007 Radpour ...................... 370/252

(Continued)

FOREIGN PATENT DOCUMENTS

EP  000802695 A2 * 10/1997

OTHER PUBLICATIONS

Vucetic et al., "Implementation and Performance Analysis of Multi-Algorithm Dynamic Channel Allocation in a Wideband Cellular Network", Dynamic Telecommunications, Inc., Watkins-Johnson Co., Apr. 1996, IEEE 0-77803-3250, pp. 1270-1274.*

Kamerman et al., "Throughput Performance of Wireless LANs Operating at 2.4 and 5 GHz", May 2000, IEEE 0-7803-6465, pp. 190-195.*

(Continued)

*Primary Examiner*—Tri H Phan
(74) *Attorney, Agent, or Firm*—Fay Kaplun & Marcin, LLP (57) ABSTRACT

Described is a system and method for receiving traffic load information for a plurality of access points, each of the access points including at least two channels for communicating and neighboring at least one of the other access points. A throughput of each channel of each access point is determined based on the traffic load information for each access point and any neighboring access points. A channel with a maximum determined throughput is selected for each access point. Each access point then switches to the selected channel at a defined probability rate.

20 Claims, 5 Drawing Sheets

U.S. PATENT DOCUMENTS

2003/0087645 A1* 5/2003 Kim et al. .................. 455/453
2004/0068556 A1   4/2004 Radpour
2004/0213182 A1  10/2004 Huh et al.
2005/0111407 A1   5/2005 Hosein et al.
2009/0209280 A1*  8/2009 Kawaguchi et al. ......... 455/525

OTHER PUBLICATIONS

Lee et al., "Optimization of AP Placement and Channel Assignment in Wireless LANs", Feb. 2002, Procedings of the 27th Annual IEEE Conference on Local Computer Networks 'LCN 02', IEEE 0742-1303, pp. 1-6.*

* cited by examiner

System 1

METHOD AND SYSTEM FOR ASSIGNING CHANNELS IN A WIRELESS LAN

PRIORITY CLAIM

This application claims priority to U.S. Provisional Patent Application Ser. No. 60/606,020, entitled "Distributed Dynamic Channel Allocation Technique for Throughput Improvement in a Dense WLAN Environment" filed Aug. 31, 2004, the disclosure of which is incorporated, in its entirety, herein.

BACKGROUND OF THE INVENTION

In the past several years, as use of mobile devices has become increasingly common, implementation of Wireless Local Area Networks (WLANs) in business and public establishments has become more widespread. For example, WLANs may be installed in office buildings, libraries, cafés, etc. A WLAN is a type of local area network that uses radio waves to communicate between nodes, as opposed to using wires. Specifically, one or more access points ("APs") may be wired to a communications network. The APs may transmit and receive radio frequency ("RF") signals to/from a plurality of WLAN stations located within the APs coverage area. Thus, the stations may communicate with and through the communications network.

Depending on a size of an environment implementing WLAN technology, a large quantity of APs may necessarily be deployed in order to provide adequate coverage. For example, a large office building wherein a number of employees are attempting to access the WLAN may require deployment of a significant quantity of APs. However, placement of the APs is crucial. While it is undesirable for APs in close proximity to interfere with one another, it is also undesirable for remotely placed APs to provide inadequate coverage. Interference may result in a corruption of data packets transmitted through the AP, transmission delays, and lower performance. In addition, stations located equidistant between two APs may flip-flop back and forth, continually reassociating with each AP and thereby sacrificing performance and efficiency. Inadequate coverage may result in an inability of one or more WLAN stations to maintain a stable connection to the network.

Dense WLAN deployments are inevitable for several reasons. For example, they may be necessary to eliminate coverage holes for a large-scale WLAN, and to maintain a high signal to noise ratio (SNR) to assure high data rates everywhere. Further, in crowded places (e.g., apartment buildings) many APs with different owners may be deployed without coordination. Where dense WLAN deployments exist, throughput of WLAN stations may suffer. For example, if channels are inadequately assigned to neighboring APs, with which the WLAN stations are associated, each WLAN station may have to compete for the same channel in order to exchange data with their APs. Thus, the channel becomes overloaded. Although there may be other channels available, a number of channels is typically limited. With only a small number of channels available, and a considerable number of stations requiring network access, problems (e.g., regarding throughput and interference) still exist in WLANs. Thus, an efficient method of deploying a plurality of APs in a WLAN, while minimizing interference and maximizing overall throughput, is desired.

SUMMARY OF THE INVENTION

A method for receiving traffic load information for a plurality of access points, each of the access points including at least two channels for communicating and neighboring at least one of the other access points. A throughput of each channel of each access point is determined based on the traffic load information for each access point and any neighboring access points. A channel with a maximum determined throughput is selected for each access point. Each access point then switches to the selected channel at a defined probability rate.

A system having a plurality of mobile units and a plurality of access points including at least two channels for communicating with the mobile units, each access point storing traffic load information for the access point and any neighboring access points, determining a best channel for communicating with the mobile and switching, at a defined probability rate, each access point to the best channel.

A method for receiving traffic load information for a plurality of access points, each of the access points including at least two channels for communicating and neighboring at least one of the other access points, determining a best channel for communicating and switching, at a defined probability rate, each access point to the selected channel.

A system having a plurality of access points including at least two channels for communicating with mobile units, each access point collecting traffic load information. The system further includes a controller receiving the traffic load information for the plurality of access points, determining a best channel for each access point to communicate with the mobile units and sending a communication to each access point indicating the best channel, wherein each access point switches, at a defined probability rate, to the best channel.

DETAILED DESCRIPTION

The present invention may be further understood with reference to the following description and the appended drawings, wherein like elements are referred to with the same reference numerals. The present invention addresses shortcomings in the field of providing wireless local area network access to a plurality of users. More specifically, the embodiments of the present invention provide for a system where multiple access points with overlapping coverage areas provide wireless access.

In a conventional WLAN, problems may exist with regard to co-channel interference, resulting from a first AP and a second AP transmitting on the same channel in an overlapping coverage area. That is, signals generated by the first AP may be broadcast over a coverage area which is also reached by signals generated by the second AP. The first and second APs may be connected to the same network or to a different network. Additionally, since a conventional WLAN operates in an unlicensed spectrum, a wireless medium (e.g., an AP) could be very noisy due to an existence of other types of radio devices operating on a same frequency band without employing carrier service multiple access with collision avoidance ("CSMA/CA"). Thus, data frames can frequently be corrupted. Throughout this description, the terms "neighboring" and "adjacent" APs are used to describe any APs that have overlapping coverage areas.

According to the present invention, channels are dynamically allocated to multiple APs with overlapping coverage areas. The channel allocations are designed to create minimal interference among neighboring APs, and thereby to optimize an overall throughput of the network. In an embodiment of the present invention, every AP simultaneously determines the best channel it should use in the next time slot based on a traffic load of its neighboring APs and the channels used by them in a current time slot. Specifically every AP may collect traffic load information pertaining to the APs own traffic load and the traffic loads of neighboring APs. Every AP may then predict its potential throughput on each channel based on the traffic load information collected, and find a best channel which corresponds to a maximum predicted throughput. However, the APs do not always switch to the best channel. Rather, the APs switch to the best channel with some fixed probability, wherein the probability is preferably between zero and one, exclusive. The APs may continually repeat this process. Accordingly, a per-user throughput is improved with every AP, and an overall throughput of the entire network is improved. Given any traffic load distribution and any initial channel allocation, the overall throughput of the network may be improved in a short period of time.

Figure 1:
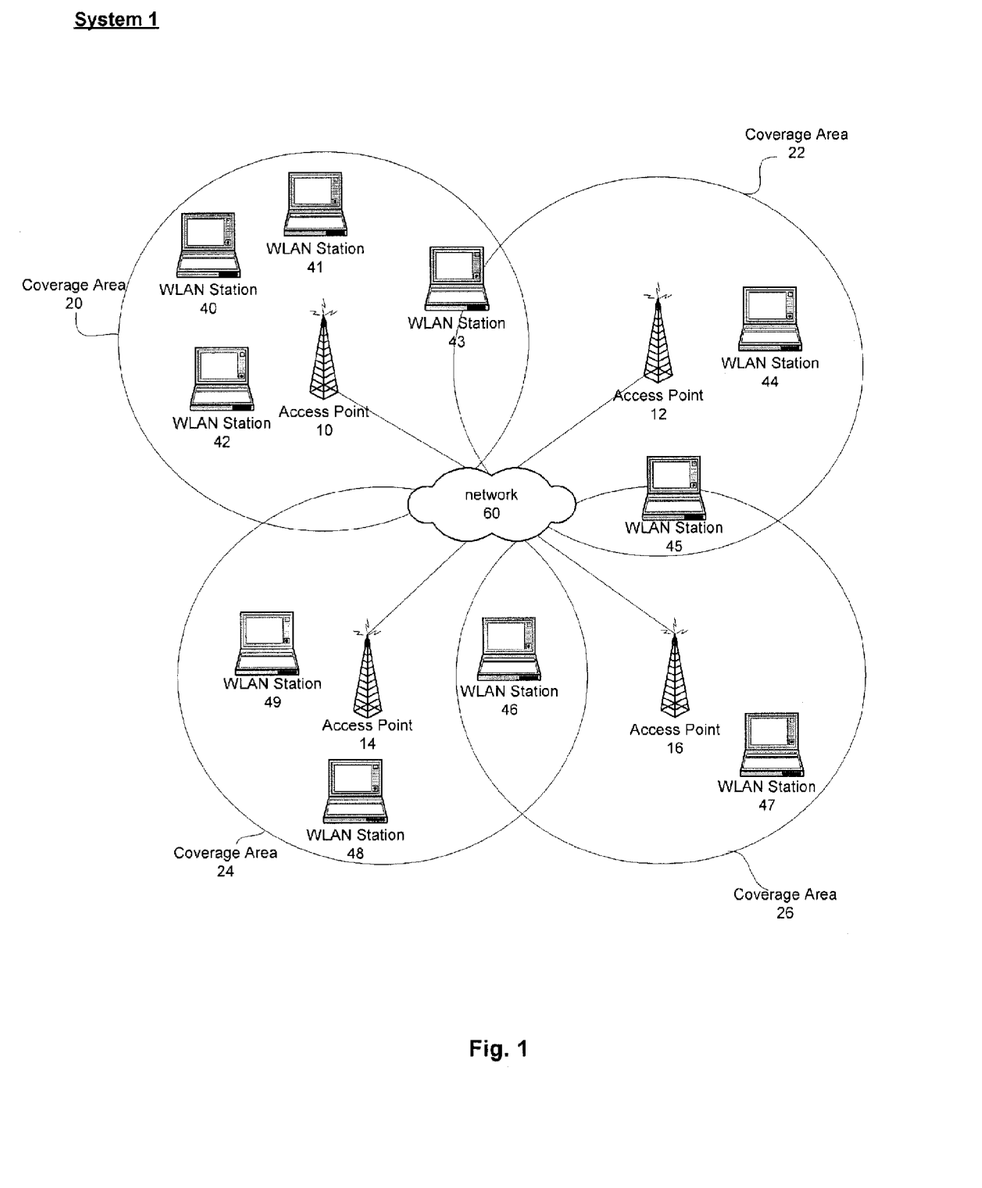
FIG. 1 shows an exemplary embodiment of a system according to the present invention.

FIG. 1 shows an exemplary system 1 according to the present invention. As shown, a plurality of APs 10, 12, 14, 16 are wired to a communications network 60. Each AP 10-16 has a corresponding coverage area 20, 22, 24, 26 over which it may transmit and receive signals. The system 1 may also include a plurality of WLAN stations 40-49. Although the stations 40-49 are depicted in FIG. 1 as being laptop computers, it will be understood by those of skill in the art that the stations may be any type of mobile unit that is capable of communicating wirelessly (e.g., mobile phones, personal digital assistants, pagers, etc.). It will also be understood by those of skill in the art that although the system 1 only shows four APs 10-16 and ten WLAN stations 40-49, any number of APs and stations may exist in the WLAN. By associating with one of the APs 10-16, each WLAN station 40-49 may communicate with the network 60 and thus with other stations 40-49 or any other device connected thereto.

The system 1 may be representative of a layout existing in a business and/or public establishment. The stations 40-49 may migrate throughout an area occupied by the system 1, and users of the stations 40-49 may expect to be able to do so seamlessly. Accordingly, it may be important to minimize coverage holes in the system 1 to allow the users to maintain a stable connection to the network 60 through one or more of the coverage areas 20-26 of the APs 10-16. Therefore, the coverage areas 20-26 may be required to overlap.

As shown, the AP 10 is associated with the stations 40-43, and thus has a greater load than the other APs 12-16. Accordingly, it may be inefficient for the AP 10 to operate on a same channel as any adjacent APs 12-16, because such operation may decrease a throughput of at least the AP 10. However, it may not be inefficient for two APs (e.g., the APs 12 and 16) with lighter loads to operate on the same channel. In a conventional system, channels may be assigned at a predetermined time. Although the channel assignment may initially be efficient, the loads of each respective AP may vary as WLAN stations connect and disconnect to the network through an AP and/or as stations migrate in and out of various coverage areas. According to the present invention, a most efficient allocation of channels may be maintained despite load variations of APs in a WLAN.

Figure 2:
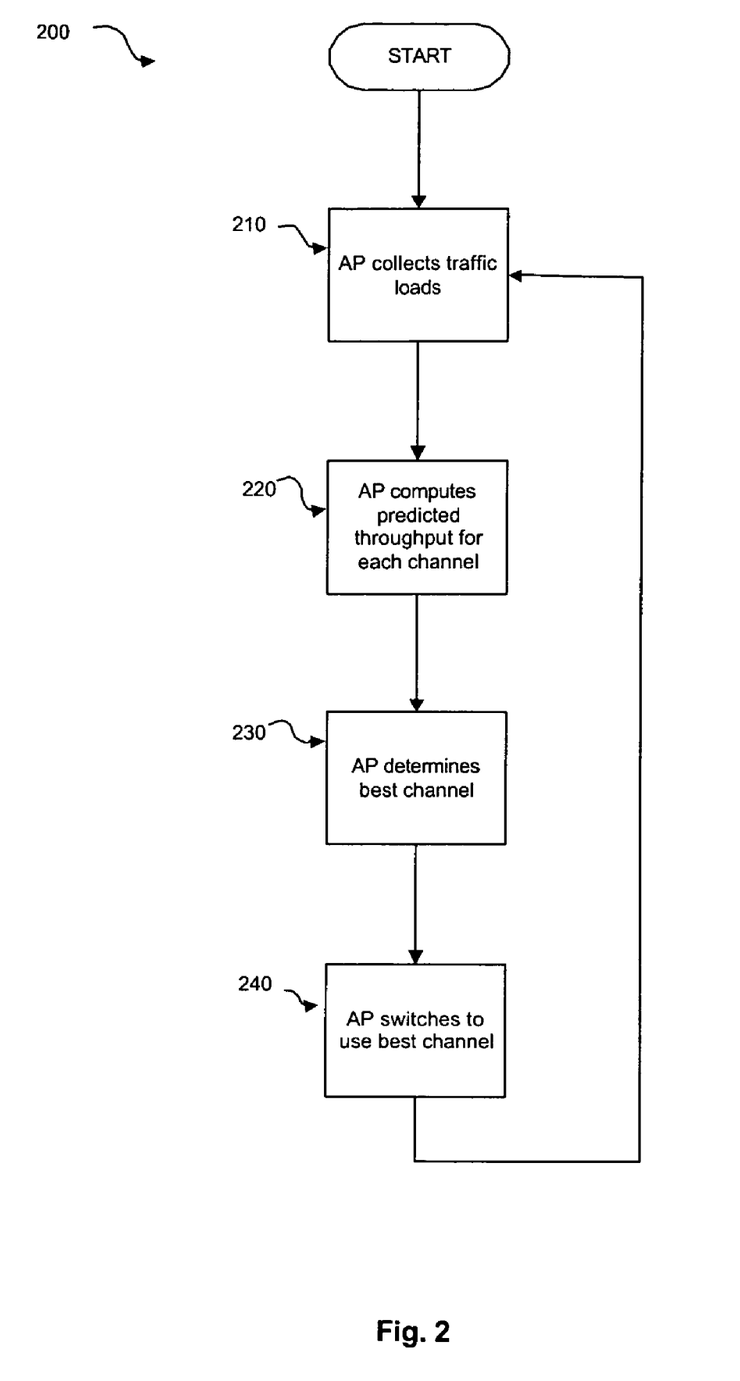
FIG. 2 shows an exemplary embodiment of a method according to the present invention.

FIG. 2 describes an exemplary method 200 for optimizing the overall throughput of a WLAN. The method 200 will be described with respect to the system 1 of FIG. 1. However, it will be understood by those of skill in the art that the method 200, and variations thereof, may also be implemented on any number of alternative network architectures.

In step 210, each AP 10-16 collects traffic load information of itself and neighboring APs. The traffic load information may include, for example, throughput information, a number of WLAN stations 40-49 associated with each AP 10-16 at a current time, etc. For example, the traffic load information pertaining to the AP 10 may indicate that it is associated with four stations (i.e., stations 40, 41, 42, 43). In one exemplary embodiment of the present invention, each AP 10-16 may store the traffic load information in a cell where it may be readily obtained and utilized by itself and neighboring APs for further applications/computations.

In a first exemplary embodiment, each AP periodically broadcasts its own traffic load information in its cell using the radio frequency ("RF") signal, i.e., the traffic load information is broadcast wirelessly by the AP in its coverage area. All APs that have overlapping coverage areas may listen to the broadcast and collect the traffic load information for the broadcasting AP. For example, when AP 10 broadcasts its traffic load information over coverage area 20, the APs 12 and 14 (those APs having overlapping coverage areas 22 and 24, respectively, with coverage area 20) may receive this broadcast, thereby informing APs 12 and 14 of the traffic load information of AP 10. The remaining APs 12-16 will also broadcast their traffic load information and any AP having an overlapping coverage are will receive the broadcast. Thus, all APs will have their own traffic load information and the traffic load information for any adjacent APs, i.e., those APs that have overlapping coverage areas.

In a second exemplary embodiment, each AP 10-16 may join a multicast IP address and periodically broadcast its traffic load information using that multicast IP address. In addition, each AP 10-16 may also broadcast the MAC addresses (or other identifying information) for its neighboring APs. This transmission may be performed via the wired portion of the network. By monitoring these multicasts, each AP will again have their own traffic load information and the traffic load information for any adjacent APs.

In a third exemplary embodiment, the system 1 may further include a controller (not shown). The controller may be, for example, a software module that is loaded onto a network device such as a network server or network appliance that can collect information from the APs, either by receiving wired broadcasts and/or polling the APs to collect the information. Again, the broadcasts or poll responses may include the traffic load information for each of the APs and the MAC addresses of the neighboring APs. The controller may then organize the information (e.g., based on neighboring APs) and distribute this information to the APs. In an alternative embodiment, the controller may collect all the information and make the channel determination for each of the APs and communicate this channel determination to the APs. Thus, the exemplary method 200, while being described as being carried out by the APs, may also have a portion of the method carried out by some other network device, e.g., a network controller.

Thus, at the completion of step 210, the traffic load information for each of the APs is known and stored, e.g., each AP includes traffic load information for itself and its adjacent APs. In step 220, each AP 10-16 computes a predicted throughput for each channel of the WLAN in its neighborhood. As discussed above, a WLAN may have multiple channels, wherein the number of channels may depend on the complexity of the network. For example, a network following the IEEE 802.11b or 802.11g standards may have three channels, whereas a network following the 802.11a standard may have eleven channels. As the number of channels increases, an occurrence of interference becomes less likely. However, a benefit received by having additional channels may be rather costly.

In one embodiment of the present invention, the AP 10-16 may predict a maximum throughput for a channel as a function of a load of the AP 10-16. For example, a maximum throughput $P_k(i, j)$, where k is a channel (e.g., channel 1, 2, or 3 for an IEEE 802.11b/g network) and (i, j) denotes a position of an AP (based on a rectangular array layout of APs), may be calculated using the following equation:

$$P_k(i, j) = \frac{M(i, j)}{\sum_{(m,n) \in S_k} M(m, n)} f\left(\sum_{(m,n) \in S_k} M(m, n)\right)$$

In this equation, $M(i, j)$ is a number of WLAN stations associating with the AP. $S_k$ represents a set of APs that are neighboring the AP in position $(i, j)$ and using the same channel k.

In another embodiment, the AP 10-16 may predict the throughput for each channel based on an analysis of the load and a preset or estimated relationship of the throughput vs. load. For example, each AP may store a theoretical throughput vs. load curve and determine the estimated throughput based on the theoretical curve. Those of skill in the art will understand that the theoretical curve may be generated based on observed values for the network (or other similar networks) or via calculations using the corresponding parameter values most appropriate for the network architecture.

In yet another embodiment of the present invention, the AP 10-16 may predict the throughput by computing a predicted aggregated traffic load distribution curve in its neighborhood for each channel. For example, the AP 10 may generate a plot of an aggregated traffic load vs. a channel number, wherein the aggregated traffic load represents the number of mobile stations 40-49 accessing the network 60 via adjacent APs 12, 14, 16 on a particular channel.

In step 230, each AP determines a best channel on which to operate in order to maximize its throughput. In one embodiment of the present invention, the best channel $k_m$ may be determined based on the above described equation for determining the maximum throughput of any one channel using the following equation:

$P_{k_m}(i, j) = \text{Max}\{P_k(i, j) | k=1,2,3\}$

This embodiment may be used to maximize an overall system throughput of multiple APs if every AP is cooperative and there is no interference. It may also be used if non-cooperative APs and/or other types of RF interference signals are present within the network. However, in such a circumstance, every AP may perform a further calculation with respect to the switching probability p, as will be discussed below.

In the embodiment described above with respect to step 220, where each AP computes a predicted aggregated traffic load distribution curve, each AP 10-16 may find a best channel based on the curve. For example, each AP 10-16 may select the channel which corresponds to a flattest aggregated traffic load distribution curve.

In step 240, each AP switches to the best channel determined in step 230. However, the APs do not always switch to the best channel. Rather, the APs switch to the best channel with some fixed probability, wherein the probability is preferably between zero and one. The switching probability adds a degree of randomness to the channel switch. As will be discussed below with respect to FIG. 5, a switching probability of p=0.5 may be optimal.

In the embodiment of the present invention where non-cooperative APs and/or other types of RF interference signals exist within a network, every AP may compute a probability p'. The computation of p' may be based on a difference between a current throughput and the predicted throughput, and a time that the AP stays using the current channel. The probability increases as the difference in throughput and/or the staying time increases. This embodiment is not limited to non-cooperative APs, but has been shown to work most effectively in these circumstances.

As shown in FIG. 2, the method 200 may then return to step 210 and repeat. That is, the APs 10-16 may continually perform the method 200, and need not cease performance in order to adapt to changes in the WLAN. If no change occurs, an equilibrium state wherein each AP 10-16 uses its best channel will be reached rather quickly.

Figure 3A:
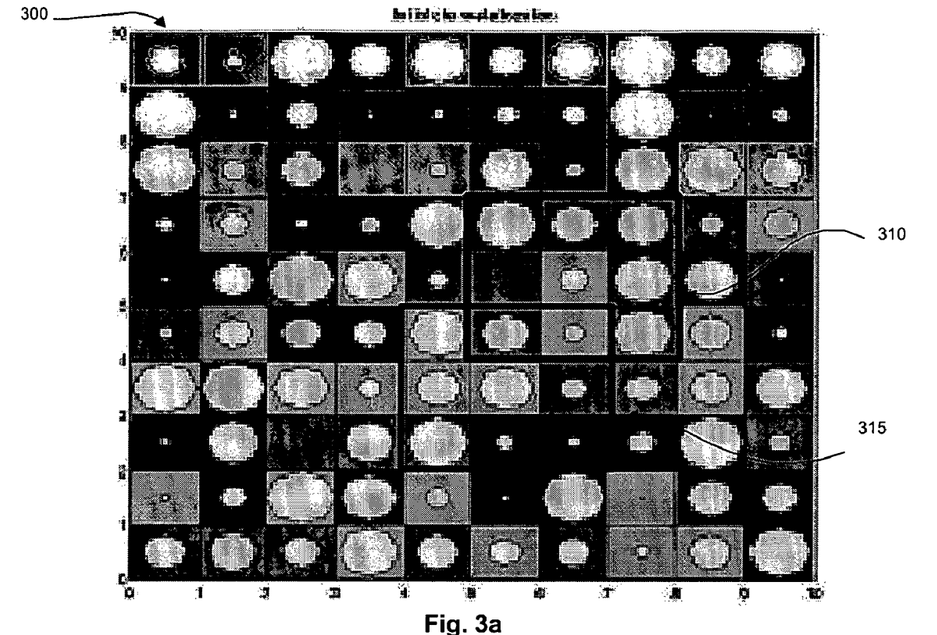
FIG. 3a shows an exemplary embodiment of a channel allocation to APs in a WLAN.
Figure 3B:
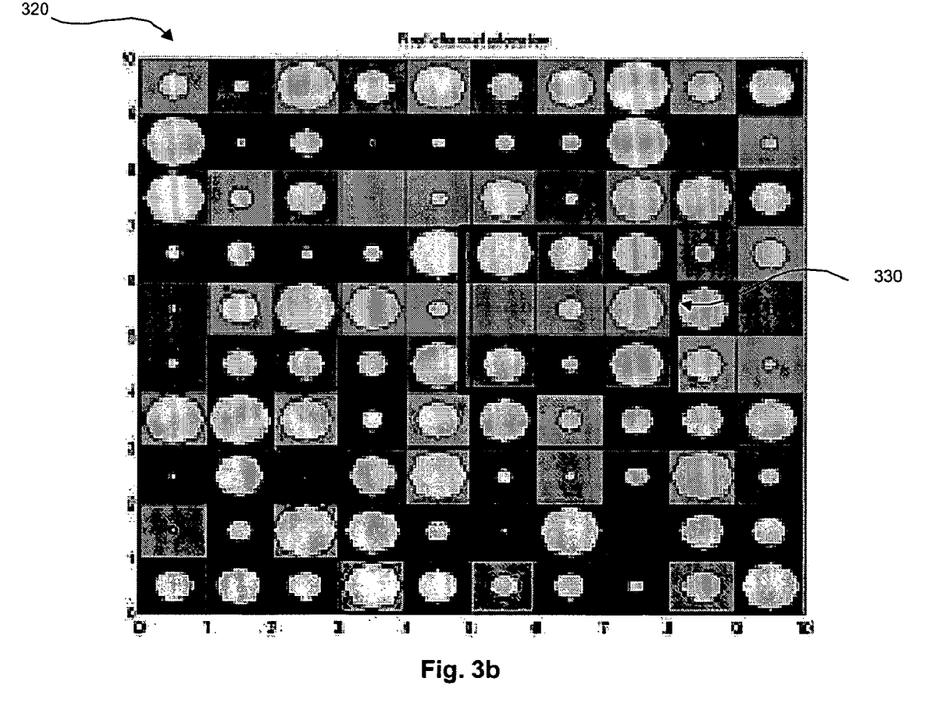
FIG. 3b shows an exemplary embodiment of a most efficient channel allocation to APs in a WLAN according to the present invention.
Figure 4:
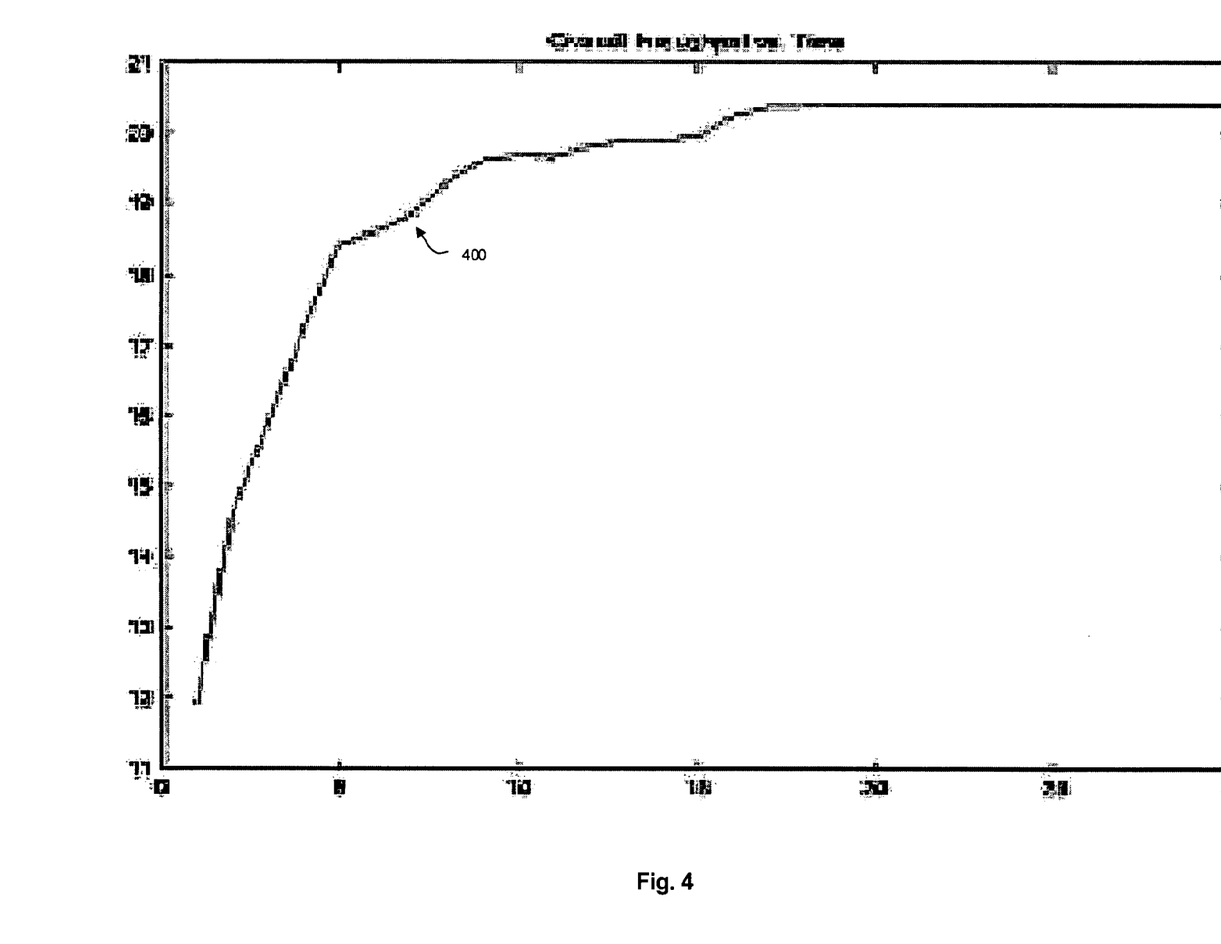
FIG. 4 shows a simulation output of an exemplary method according to the present invention.
Figure 5:
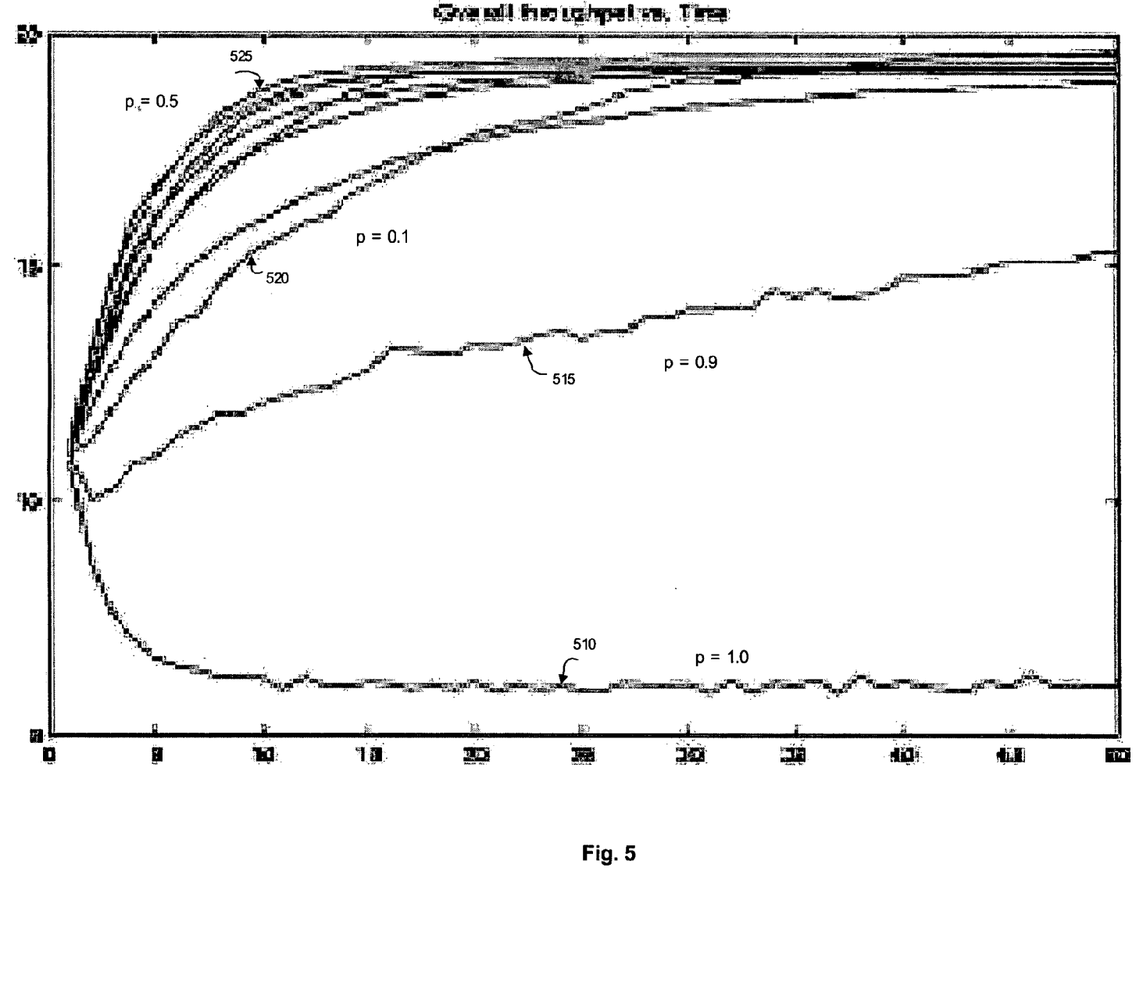
FIG. 5 shows another simulation output of an exemplary method according to the present invention.

Computer simulation of the steps of the method 200 has verified its effectiveness. Results of a simulation are shown in FIGS. 3-5. The simulation involved computing a maximum throughput $P_k(i, j)$ of every AP, determining the best channel $k_m$, and switching to the channel $k_m$ with a probability p. It is assumed for purposes of the simulation that every AP on the WLAN broadcasts load information and detects the broadcast information from all adjacent APs as described with reference to step 210. However, it should be understood that the steps involved in the simulation and the results are exemplary, and thus should be regarded in an illustrative rather than a restrictive sense.

FIG. 3a shows a grid 300 representing a dense population of APs in a WLAN, where each dot represents one AP. As shown, one hundred APs are arranged in a 10×10 matrix. However, the formation may include any number and/or arrangement of APs. For example, an office building deploying forty APs may use a 5×8 matrix or an alternative design where a concentrated number of APs are placed in a particular area.

As shown, the load of each AP is represented by a size of each dot. Specifically, the larger dots represent APs with which a significant number of stations are associated, whereas the smaller dots represent APs with which fewer stations are associated. The loads of each respective AP will only affect the throughput of adjacent APs. For example, if there are three APs X, Y, Z in a row that use the same channel, the loads of X and Z will affect the throughput of Y. However, the load of X will not affect the throughput of Z, and vice versa. The channel used by each AP to transmit and receive signals is represented by a color (or shading) of a box surrounding the dot. As can be seen, there are three channels used on the WLAN of grid 300. However, the channels are not efficiently allocated to the APs, and thus an overall throughput of the network suffers.

Within the grid 300, neighborhoods (e.g., neighborhood 310) consisting of several APs may be formed. The neighborhood 310 is formed by a 3×3 matrix of APs, although a neighborhood may include any number and/or arrangement of adjacent APs. Further, an AP may reside in more than one neighborhood at one time. For example, as can be seen in FIG. 3a, some APs residing in the neighborhood 310 also reside in a neighborhood 315. Analysis of the exemplary systems, methods and results of the present invention may be facilitated by use of the 3×3 matrix, as will be seen below. However, when analyzing a neighborhood of nine APs, in a network utilizing three channels, it is inevitable that some or all WLAN stations and APs in each neighborhood will have to share a channel.

FIG. 3b shows a grid 320 representing the population of APs of the grid 300 after reaching an equilibrium state. As can be seen, the load of each AP remains the same. However, the channels (represented by the three varying shades) have been allocated according to an embodiment of the present invention to improve the throughput of each respective AP.

A neighborhood 330 represents a state of the APs of the neighborhood 310 where all the APs have converged (i.e., wherein the APs have reached the equilibrium state). Focusing on differences between the neighborhood 310 and the neighborhood 330 may more clearly illustrate how an overall throughput is improved. It can be seen that neighboring APs having a large number of associated WLAN stations use different channels, and those having a few associated WLAN stations may share a channel. In other words, if an AP tends to be the largest in its neighborhood 330, it will tend to get a channel with minimal sharing, and adjacent APS with relatively light loads tend to be grouped together with the same channel. Accordingly, each AP is operating at a maximum throughput, and thus a WLAN including the APs of the grid 320 may be operating at a maximum throughput.

FIG. 4 shows a plot representing a change in overall throughput over time. An x-axis of the plot depicts iterations 0-30 of a method (e.g., the method 200) according to the present invention. A y-axis depicts the overall throughput of a network (e.g., the system 1 of FIG. 1). As can be seen, a curve 400 of plotted points rises sharply within the first few iterations. Specifically, between 0 and 5 iterations, an overall throughput of the network increased from 12 to approximately 18.5. It can also be seen that the curve 400 continues to rise between 5-10 iterations, but then begins to taper after the $10^{th}$ iteration. At approximately the $17^{th}$ iteration, the curve 400 ceases to rise, thereby indicating that the equilibrium state has been reached.

In the equilibrium state, every AP is using the best channel that maximizes its local throughput. Therefore, the overall throughput of the dense WLAN should have been significantly improved. This is confirmed by the plot of FIG. 4, which shows a 70% improvement achieved by the method 200 in less than twenty iterations. The equilibrium state may be reached with such rapidity because of a distributed computing nature of the method 200. That is, because computations may be performed individually at each AP 10-16, as opposed to being performed by a central controller, they may be performed more quickly.

FIG. 5 shows a plot depicting a change in convergence speed as the switching probability p is varied. Similar to the plot of FIG. 4, the x-axis denotes a number of iterations of the method 200, and the y-axis denotes an overall throughput of a WLAN. Given a layout of a dense WLAN, there exists an optimal switching probability that can minimize a convergence time (i.e., the time taken to reach the equilibrium state). Each curve of the plot corresponds to a different switching probability, and represents an average of a thousand simulation runs with a thousand randomly generated initial channel allocations and load distributions.

For ease of analysis, one may consider curves 510, 515, 520, and 525 which correspond to respective switching probabilities of p=1.0, p=0.9, p=0.1, and p=0.5. As shown by the curve 510, the switching probability of p=1.0, where no randomness in channel switch exists, is ineffective in converging the APs on the network. In other words, a WLAN in which the APs always switch to the best channel may fail to reach equilibrium. This may result from the fact that, as shown in FIGS. 3a-b, APs with high traffic loads tend to cluster and each of these APs with maximum loads in the same area may select the same channel, thereby not allowing for the desired increased throughput.

As depicted by the curve 515, a switching probability of p=0.9 may be used in converging the APs. However, it is inefficient in that it may take a tremendous number of iterations to reach equilibrium. The curve 515 failed to reach even a remote state of equilibrium within the 50 iterations shown in FIG. 5. As shown by the curve 520, wherein the switching probability p=0.1, the APs on the WLAN converge rather quickly. The curve 520 rises steadily, showing continual improvement in overall throughput of the network, and reaches equilibrium after approximately 35 iterations. The curve 525 shows that the switching probability of p=0.5 is optimal. After rising sharply, the curve 525 begins to stabilize at a point denoting convergence of the APs before any of the other curves representing alternative switching probabilities.

The present invention may prove to be particularly advantageous in several regards. For one, a WLAN may exist wherein multiple APs with overlapping coverage areas are deployed, and therefore no coverage holes exist. Accordingly, users operating WLAN stations may seamlessly move through the network while maintaining a stable wireless connection. Further, operation of the WLAN may be cost effective, as fewer channels may be required and a central controller is not needed. Despite a limited number of channels, the APs may associate with WLAN stations with minimal interference. Also, due to simplicity of the system and method, a relatively small amount of computing power is required.

Another advantage of the present invention is a high performance, revealed by intensive simulations. Specifically, the simulations verified that multiple APs with overlapping coverage areas in a WLAN may reach equilibrium with few iterations of a method according to the present invention. Thus, the overall throughput of the network is improved in a relatively short period of time.

A further advantage is that the system and method for assigning channels is self-adaptive. In other words, the APs do not need to pause or stop performing the method to adapt to changes in the WLAN. If no change occurs, the APs of the WLAN will reach the equilibrium state with increased rapidity. The present invention may be particularly advantageous with respect to optimizing the performance of a WLAN under non-uniform traffic conditions because it has been shown to adaptively allow the WLAN to reach equilibrium in very few iterations.

The present invention has been described with reference to specific exemplary embodiments. Those skilled in the art will understand that changes may be made in the details of the invention, without departing from the teaching of the invention. Accordingly, various modifications and changes may be made to the embodiments without departing from the broad-

What is claimed is:

1. A method, comprising:
receiving traffic load information for a plurality of access points, each of the access points including at least two channels for communicating and neighboring at least one of the other access points;
determining a throughput of each channel of each access point based on the traffic load information for each access point and any neighboring access points;
selecting, for each access point, the channel with a maximum determined throughput; and switching, at a defined probability rate, each access point to the selected channel, wherein the probability rate is based on a difference between a current throughput and a predicted throughput for a time that each access point stays on a current channel.

2. The method of claim 1, wherein the traffic load information includes one of a number of mobile units associated with each access point and an actual throughput of each access point.

3. The method of claim 1, wherein the at least two channels is three channels.

4. The method of claim 1, further comprising:
repeating each of the steps of claim 1.

5. The method of claim 1, wherein the probability rate is between 0 and 1.

6. The method of claim 5, wherein the probability rate is 0.5.

7. A system, comprising:
a plurality of mobile units; and
a plurality of access points including at least two channels for communicating with the mobile units, each access point storing traffic load information for the access point and any neighboring access points, determining a best channel for communicating with the mobile and switching, at a defined probability rate, each access point to the best channel, wherein the probability rate is based on a difference between a current throughput and a predicted throughput for a time that each access point stays on a current channel.

8. The system of claim 7, wherein the best channel is determined by calculating a throughput of each channel of each access point based on the traffic load information for each access point and any neighboring access points and selecting, for each access point, the channel with a maximum determined throughput.

9. The system of claim 7, wherein the traffic load information is an aggregated traffic load distribution and the best channel is determined based on an aggregated traffic load distribution curve.

10. The system of claim 7, wherein the best channel is determined based on a stored curve of throughput versus traffic load.

11. The system of claim 7, wherein each access point wirelessly transmits the traffic load information to a coverage area of the access point.

12. The system of claim 7, wherein each access point transmits the traffic information to a wired network.

13. The system of claim 12, wherein each access point transmits the traffic information to the wired network via a multicast IP address.

14. The system of claim 7, wherein the access points and mobile units form a WLAN.

15. The system of claim 7, wherein each mobile unit associates with one access point and the traffic load information includes a number of mobile units that are associated with each access point.

16. A method, comprising:
receiving traffic load information for a plurality of access points, each of the access points including at least two channels for communicating and neighboring at least one of the other access points;
determining a best channel for communicating; and
switching, at a defined probability rate, each access point to the best channel, wherein the probability rate is based on a difference between a current throughput and a predicted throughput for a time that each access point stays on a current channel.

17. The method of claim 16, wherein the determining the best channel includes:
determining a throughput of each channel of each access point based on the traffic load information for each access point and any neighboring access points; and
selecting, for each access point, the channel with a maximum determined throughput.

18. The method of claim 16, wherein the determining the best channel includes:
comparing the traffic load information to a stored traffic load versus throughput curve.

19. The method of claim 16, wherein the traffic load information includes an aggregated traffic load distribution and the determining the best channel includes:
comparing the aggregated traffic load distribution to a stored aggregated traffic load distribution curve.

20. A system, comprising:
a plurality of access points including at least two channels for communicating with mobile units, each access point collecting traffic load information; and
a controller receiving the traffic load information for the plurality of access points, determining a best channel for each access point to communicate with the mobile units and sending a communication to each access point indicating the best channel, wherein each access point switches, at a defined probability rate, to the best channel, wherein the probability rate is based on a difference between a current throughput and a predicted throughput for a time that each access point stays on a current channel.

* * * * *